US012633552B2

(12) United States Patent
Lee et al.

(10) Patent No.: US 12,633,552 B2
(45) Date of Patent: May 19, 2026

(54) CONDENSATE WATER DRAIN CONTROL SYSTEM AND METHOD FOR FUEL CELLS

(71) Applicants:Hyundai Motor Company, Seoul (KR); Kia Corporation, Seoul (KR)

(72) Inventors: Joon Yong Lee, Seoul (KR); Dong Hun Lee, Anyang (KR); Soon Woo Kwon, Yongin (KR); Sung Gone Yoon, Suwon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/450,724

(22) Filed: Aug. 16, 2023

(65) Prior Publication Data

US 2024/0088411 A1     Mar. 14, 2024

Related U.S. Application Data

(62) Division of application No. 17/034,165, filed on Sep. 28, 2020, now abandoned.

(30) Foreign Application Priority Data

May 19, 2020     (KR) ........................ 10-2020-0059600

(51) Int. Cl.
H01M 8/04119     (2016.01)
H01M 8/04082     (2016.01)
(Continued)

(52) U.S. Cl.
CPC ... H01M 8/04164 (2013.01); H01M 8/04179 (2013.01); H01M 8/04201 (2013.01);
(Continued)

(58) Field of Classification Search
CPC ......... H01M 8/04179; H01M 8/04388; H01M 8/04753; H01M 8/04761; H01M 8/04843; H01M 8/04164
See application file for complete search history.

(56) References Cited

U.S. PATENT DOCUMENTS

2004/0013919 A1* 1/2004 Ueda ................. H01M 8/04231
                                                          429/445
2005/0244686 A1* 11/2005 Kamihara ......... H01M 8/04097
                                                          429/444

(Continued)

FOREIGN PATENT DOCUMENTS

KR          10-0767520 B1    10/2007
KR          10-0969063 B1    7/2010
KR     10-2020-0111315 A     9/2020

OTHER PUBLICATIONS

Office Action issued Dec. 23, 2024 in corresponding Chinese Application No. 202011144971.5.

*Primary Examiner* — Brian R Ohara
*Assistant Examiner* — Brent C Thomas
(74) *Attorney, Agent, or Firm* — Fox Rothschild LLP

(57)     ABSTRACT

A condensate water drain control system for fuel cells includes a fuel cell stack configured to generate electric power through chemical reaction, a fuel supply line configured to recirculate fuel discharged from the fuel cell stack together with fuel introduced from a fuel supply valve, a water trap located in the fuel supply line, the water trap being configured to collect condensate water discharged from the fuel cell stack, a drain valve configured to discharge the condensate water stored in the water trap to the outside when opened, and a drain controller configured to determine whether the fuel supply valve is controlled such that pressure in the fuel supply line is maintained before the drain valve is opened and to sense discharge of fuel from the fuel (Continued)

supply line through the drain valve upon determining that the pressure is maintained.

4 Claims, 3 Drawing Sheets

(51) Int. Cl.
    *H01M 8/04746*     (2016.01)
    *H01M 8/04858*     (2016.01)

(52) U.S. Cl.
    CPC ..... *H01M 8/04753* (2013.01); *H01M 8/0494* (2013.01); *H01M 8/04947* (2013.01); *H01M 2250/20* (2013.01)

(56)             References Cited

U.S. PATENT DOCUMENTS

| | | | |
|---|---|---|---|
| 2008/0299426 A1* | 12/2008 | Ando | H01M 8/04776 |
| | | | 429/441 |
| 2009/0035612 A1 | 2/2009 | Suematsu et al. | |
| 2009/0068517 A1* | 3/2009 | Andersen | H01M 8/04328 |
| | | | 429/429 |
| 2010/0203411 A1* | 8/2010 | Hasuka | H01M 8/04156 |
| | | | 429/442 |
| 2010/0297518 A1* | 11/2010 | Wake | H01M 8/04753 |
| | | | 429/443 |
| 2017/0179511 A1 | 6/2017 | Jung et al. | |
| 2018/0196108 A1 | 7/2018 | Piffard et al. | |
| 2020/0303751 A1 | 9/2020 | Lee et al. | |

* cited by examiner

Figure 2:
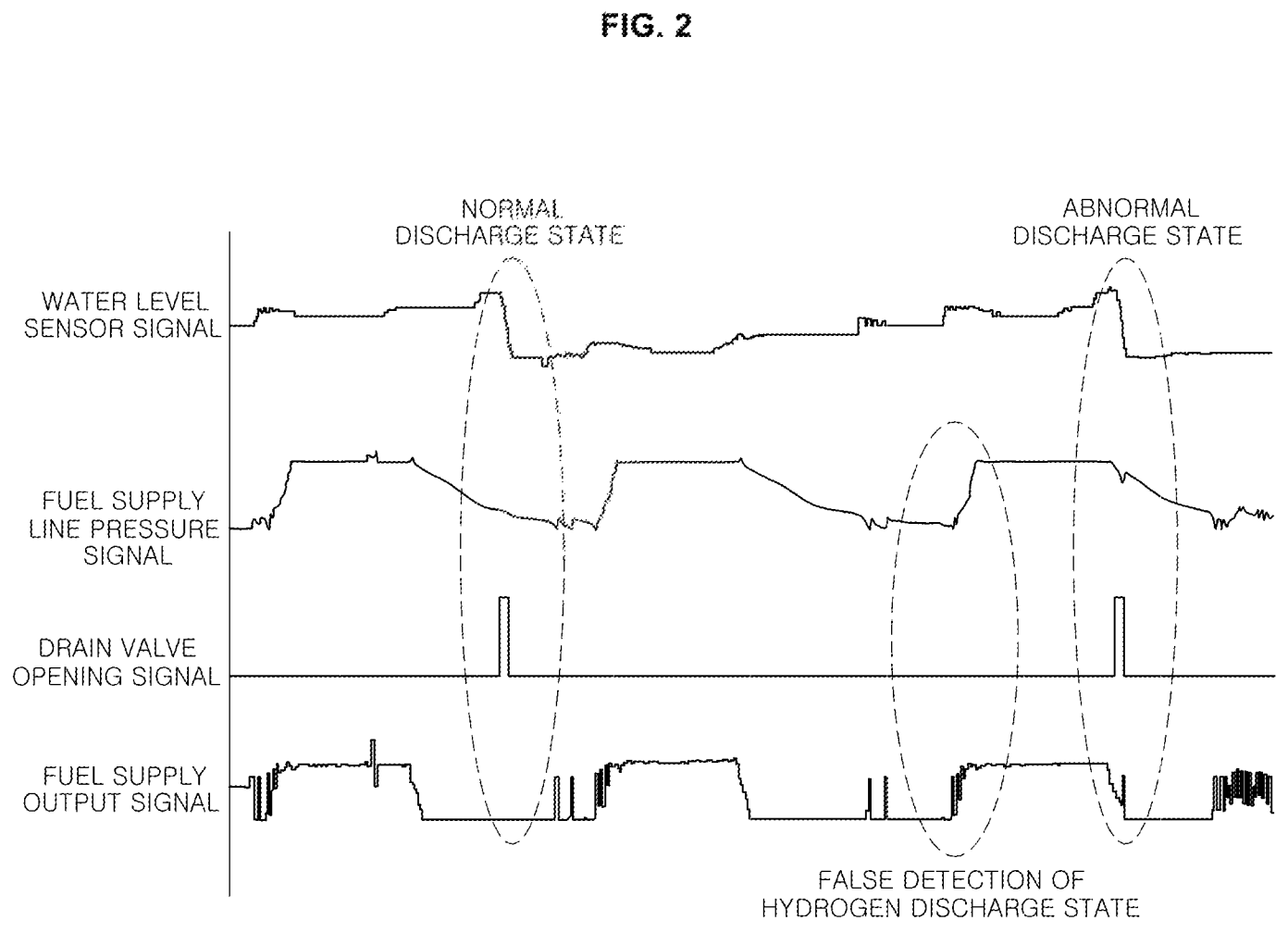

NORMAL DISCHARGE STATE

ABNORMAL DISCHARGE STATE

FALSE DETECTION OF HYDROGEN DISCHARGE STATE

WATER LEVEL SENSOR SIGNAL

FUEL SUPPLY LINE PRESSURE SIGNAL

DRAIN VALVE OPENING SIGNAL

FUEL SUPPLY OUTPUT SIGNAL

FIG. 3

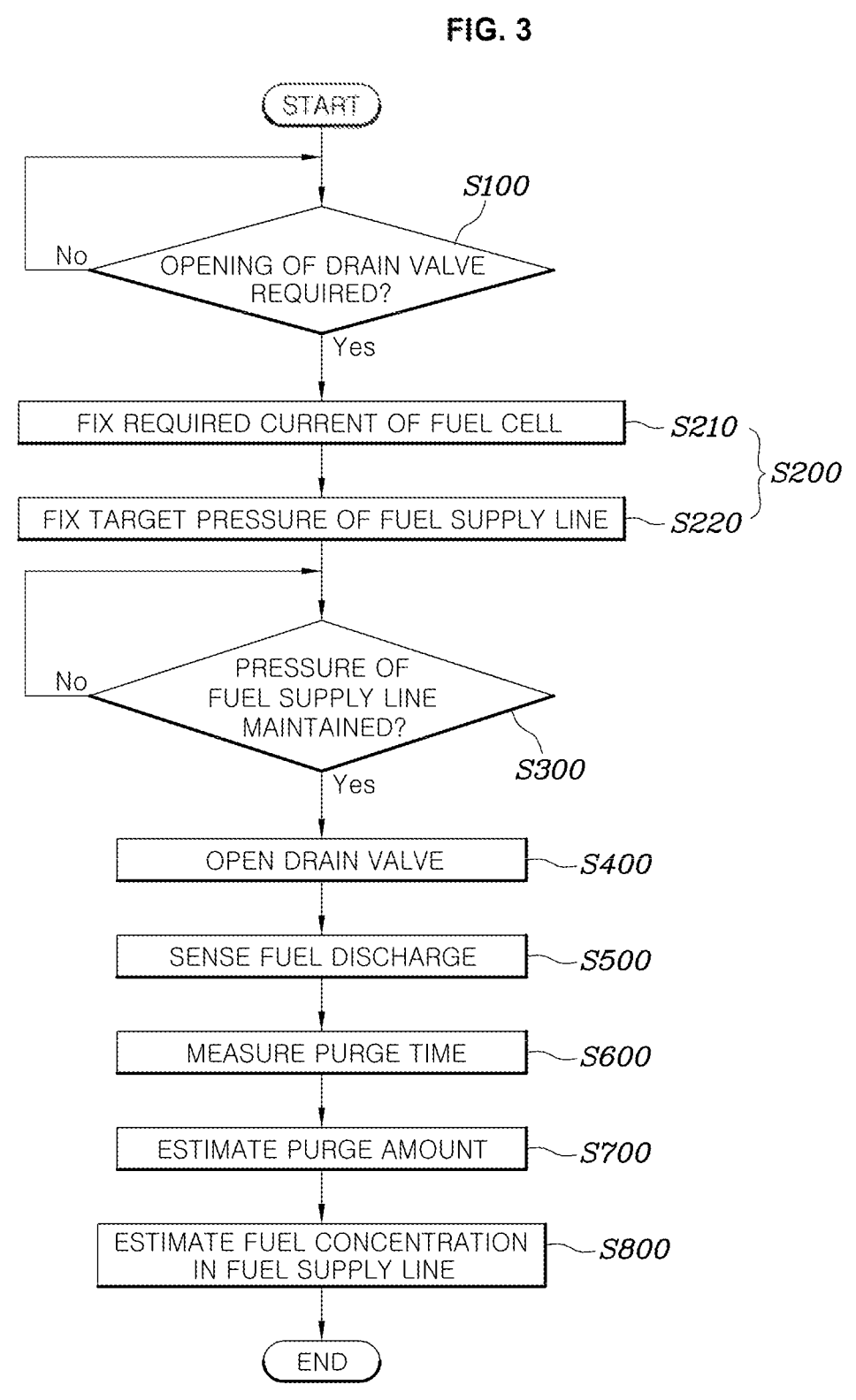

START

*S100*

OPENING OF DRAIN VALVE REQUIRED?

No

Yes

FIX REQUIRED CURRENT OF FUEL CELL — *S210*

FIX TARGET PRESSURE OF FUEL SUPPLY LINE — *S220*

*S200*

PRESSURE OF FUEL SUPPLY LINE MAINTAINED?

No

Yes

*S300*

OPEN DRAIN VALVE — *S400*

SENSE FUEL DISCHARGE — *S500*

MEASURE PURGE TIME — *S600*

ESTIMATE PURGE AMOUNT — *S700*

ESTIMATE FUEL CONCENTRATION IN FUEL SUPPLY LINE — *S800*

END

CONDENSATE WATER DRAIN CONTROL SYSTEM AND METHOD FOR FUEL CELLS

CROSS-REFERENCE TO RELATED APPLICATION

This application is a Division of U.S. patent application Ser. No. 17/034,165, filed on Sep. 28, 2020, which claims under 35 U.S.C. § 119(a) the benefit of Korean Patent Application No. 10-2020-0059600, filed on May 19, 2020 with the Korean Intellectual Property Office, the entire contents of which are incorporated by reference herein.

BACKGROUND

1. Technical Field

The present disclosure relates to a condensate water drain control system and method for fuel cells, more particularly, to the condensate water drain control system and method that are configured to sense hydrogen discharged from a hydrogen supply line by opening of a drain valve.

2. Description of the Related Art

A fuel cell is a battery that directly converts chemical energy generated as the result of oxidation of fuel into electrical energy, and thus serves as a type of power generation device. A fuel cell is similar to a chemical cell in that reduction-oxidation is used, but is different from the chemical cell in that a reactant is continuously introduced from the outside and a reaction product is continuously discharged out of a system, unlike the chemical cell, which is configured such that cell reaction occurs in a closed system. In recent years, a fuel cell generation system has been used practically, e.g., in a fuel cell vehicle, and research into using a fuel cell as an energy source for environmentally-friendly vehicles has been actively conducted, since a reaction product from the fuel cell is pure water.

A fuel cell system includes a fuel cell stack configured to generate electric energy through chemical reaction, an air supply device configured to supply air to an air electrode of the fuel cell stack, and a hydrogen supply device configured to supply hydrogen to a hydrogen electrode of the fuel cell stack.

When electric power is generated in the fuel cell stack, water is generated in the fuel cell stack. Some of the water is discharged to the hydrogen electrode through an electrolyte membrane due to a concentration difference. Hydrogen gas is recirculated to the hydrogen supply device through a recirculation device, and the water discharged from the hydrogen electrode is condensed and is stored in a water trap included in the hydrogen supply device.

The water trap includes a water level sensor. When the level of condensate water sensed by the water level sensor is greater than or equal to a predetermined discharge level, a drain valve is opened to discharge the stored condensate water to the outside. In addition, when the level of condensate water sensed by the water level sensor is greater than or equal to a predetermined interruption level, the drain valve is closed to prevent the discharge of hydrogen.

In a case in which the water level sensor of the water trap breaks, however, it is not possible to measure the level of condensate water stored in the water trap, whereby it is not possible to appropriately control the drain valve. In particular, when condensate water in the hydrogen supply device is not smoothly discharged to the outside, the water generated in the fuel cell stack cannot be discharged to the outside, whereby flow channels in a separator are blocked. If the drain valve is opened more than necessary, hydrogen is unnecessarily discharged, whereby fuel economy is deteriorated.

Conventionally, in order to solve this problem, fail-safe control is performed to open the drain valve when, based on a current integration value obtained by integrating current generated in the fuel cell stack, the current integration value reaches a predetermined value in the case in which the water level sensor of the water trap breaks. Since the amount of condensate water stored in the water trap is not uniform depending on the state of the fuel cell stack, however, it is not possible to accurately measure the level of the water trap.

To address this problem, a method of measuring the pressure in the hydrogen supply line in the state in which the drain valve is open is used. In the case in which target pressure in the hydrogen supply line is variable in the state in which the drain valve is open, however, the discharge of hydrogen is falsely detected despite hydrogen not being discharged from the hydrogen supply line.

The matters disclosed in this section are merely for enhancement of understanding of the general background of the disclosure and should not be taken as an acknowledgment or any form of suggestion that the matters form the related art already known to a person skilled in the art.

SUMMARY

The present disclosure provides technology for accurately sensing the discharge of hydrogen from a hydrogen supply line by opening of a drain valve.

In accordance with an aspect of the present disclosure, the above and other objects can be accomplished by the provision of a condensate water drain control system for fuel cells, the condensate water drain control system including a fuel cell stack configured to generate electric power through chemical reaction in the fuel cell stack, a fuel supply line configured to recirculate fuel discharged from the fuel cell stack together with fuel introduced from a fuel supply valve so as to be supplied to the fuel cell stack, a water trap located in the fuel supply line, the water trap being configured to collect condensate water discharged from the fuel cell stack, a drain valve located in an outlet of the water trap, the drain valve being configured to discharge the condensate water stored in the water trap to the outside when opened, and a drain controller configured to determine whether the fuel supply valve is controlled such that pressure in the fuel supply line is maintained before the drain valve is opened and to sense discharge of fuel from the fuel supply line through the drain valve upon determining that the pressure is maintained.

The drain controller may determine whether the fuel supply valve is controlled such that the pressure in the fuel supply line is maintained based on a change in pressure in the fuel supply line or a change in opening degree of the fuel supply valve in the state in which the drain valve is closed.

The condensate water drain control system may further include a pressure sensor configured to sense the pressure in the fuel supply line, wherein the drain controller may determine whether the fuel supply valve is controlled such that the pressure in the fuel supply line is maintained based on a change in a pressure signal sensed by the pressure sensor.

The condensate water drain control system may further include a fuel tank configured to store fuel in the fuel tank and a fuel supply controller configured to control the opening degree of the fuel supply valve such that the pressure in the fuel supply line follows a target pressure, wherein the drain controller may determine whether the fuel supply valve is controlled such that the pressure in the fuel supply line is maintained based on a change in a signal for controlling the opening degree of the fuel supply valve from the fuel supply controller.

The fuel supply controller may fix the target pressure in the fuel supply line in the case in which opening of the drain valve is required.

The condensate water drain control system may further include a power controller configured to fix required current or required power of the fuel cell stack in the case in which opening of the drain valve is required.

The condensate water drain control system may further include a battery configured to be assist generation of electric power by the fuel cell stack while being charged or discharged by electric power generated by the fuel cell stack and a load connected to the fuel cell stack and the battery to receive electric power from the fuel cell stack or the battery, wherein the power controller may control the required current or required power of the fuel cell stack based on required power of the load or a charge amount of the battery, and may control charging and discharging of the battery in order to satisfy the required power of the load in the case in which the required current or required power of the fuel cell stack is fixed.

The drain controller may sense the discharge of fuel from the fuel supply line through the drain valve based on a change in pressure in the fuel supply line or a change in opening degree of the fuel supply valve in the state in which the drain valve is open.

The drain valve may be configured to have a purge function of purging fuel in the fuel supply line to the outside when opened, and the drain controller may measure a purge time from the point in time when the discharge of fuel from the fuel supply line through the drain valve is sensed to the point in time when the drain valve is closed.

The condensate water drain control system may further include a concentration estimator configured to estimate an amount purged by opening of the drain valve and to estimate concentration of fuel in the fuel supply line through reflection of the estimated purge amount.

In accordance with another aspect of the present disclosure, there is provided a condensate water drain control system for fuel cells, the condensate water drain control system including a fuel cell stack configured to generate electric power through chemical reaction in the fuel cell stack, a fuel supply line configured to recirculate fuel discharged from the fuel cell stack together with fuel introduced from a fuel supply valve so as to be supplied to the fuel cell stack, a water trap located in the fuel supply line, the water trap being configured to collect condensate water discharged from the fuel cell stack, a drain valve located in an outlet of the water trap, the drain valve being configured to discharge the condensate water stored in the water trap to the outside when opened, a drain controller configured to sense the discharge of fuel from the fuel supply line through the drain valve, and a fuel supply controller configured to control the fuel supply valve such that pressure in the fuel supply line is maintained when the drain valve is opened under control of the drain controller.

In accordance with a further aspect of the present disclosure, there is provided a condensate water drain control method for fuel cells, the condensate water drain control method including: determining, by a drain controller, whether a fuel supply valve is controlled such that pressure is maintained in a fuel supply line, which is configured to recirculate fuel discharged from a fuel cell stack together with fuel introduced from the fuel supply valve so as to be supplied to the fuel cell stack; opening, by the drain controller, a drain valve located in an outlet of a water trap located in the fuel supply line, the water trap being configured to collect condensate water discharged from the fuel cell stack, the drain valve being configured to discharge condensate water stored in the water trap to an outside when opened; and sensing, by the drain controller, discharge of fuel from the fuel supply line through the drain valve upon determining in the determining step that the pressure is maintained.

The step of determining whether the fuel supply valve is controlled such that the pressure in the fuel supply line is maintained may include determining whether the fuel supply valve is controlled such that the pressure in the fuel supply line is maintained based on a change in pressure in the fuel supply line or a change in opening degree of the fuel supply valve in the state in which the drain valve is closed.

The condensate water drain control method may further include determining whether opening of the drain valve is required before the step of determining whether the fuel supply valve is controlled such that the pressure in the fuel supply line is maintained and fixing a target pressure in the fuel supply line or fixing required current or required power of the fuel cell stack upon determining that opening of the drain valve is required.

The condensate water drain control method may further include measuring a purge time from the point in time when the discharge of fuel from the fuel supply line through the drain valve is sensed to the point in time when the drain valve is closed after the step of sensing the discharge of fuel, estimating an amount purged by opening of the drain valve based on the measured purge time, and estimating concentration of fuel in the fuel supply line through reflection of the estimated purge amount.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a view showing the construction of a condensate water drain control system for fuel cells according to an embodiment of the present disclosure;

FIG. 2 is a view showing conventional condensate water drain and fuel supply control signals; and FIG. 3 is a flowchart showing a condensate water drain control method for fuel cells according to an embodiment of the present disclosure.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions of the embodiments of the present disclosure disclosed in this specification or this disclosure are given only for illustrating embodiments of the present disclosure. Embodiments of the present disclosure may be realized in various forms, and should not be interpreted to be limited to the embodiments of the present disclosure disclosed in this specification or this disclosure.

Since the embodiments of the present disclosure may be variously modified and may have various forms, specific embodiments will be shown in the drawings and will be described in detail in this specification or this disclosure. However, the embodiments according to the concept of the present disclosure are not limited to such specific embodiments, and it should be understood that the present disclosure includes all alterations, equivalents, and substitutes that fall within the idea and technical scope of the present disclosure.

It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element, and similarly, a second element may be referred to as a first element.

It will be understood that when a component is referred to as being "connected to" or "coupled to" another component, it may be directly connected to or coupled to the other component, or intervening components may be present. In contrast, when a component is referred to as being "directly connected to" or "directly coupled to" another component, there are no intervening components present. Other terms that describe the relationship between components, such as "between" and "directly between" or "adjacent to" and "directly adjacent to", must be interpreted in the same manner.

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
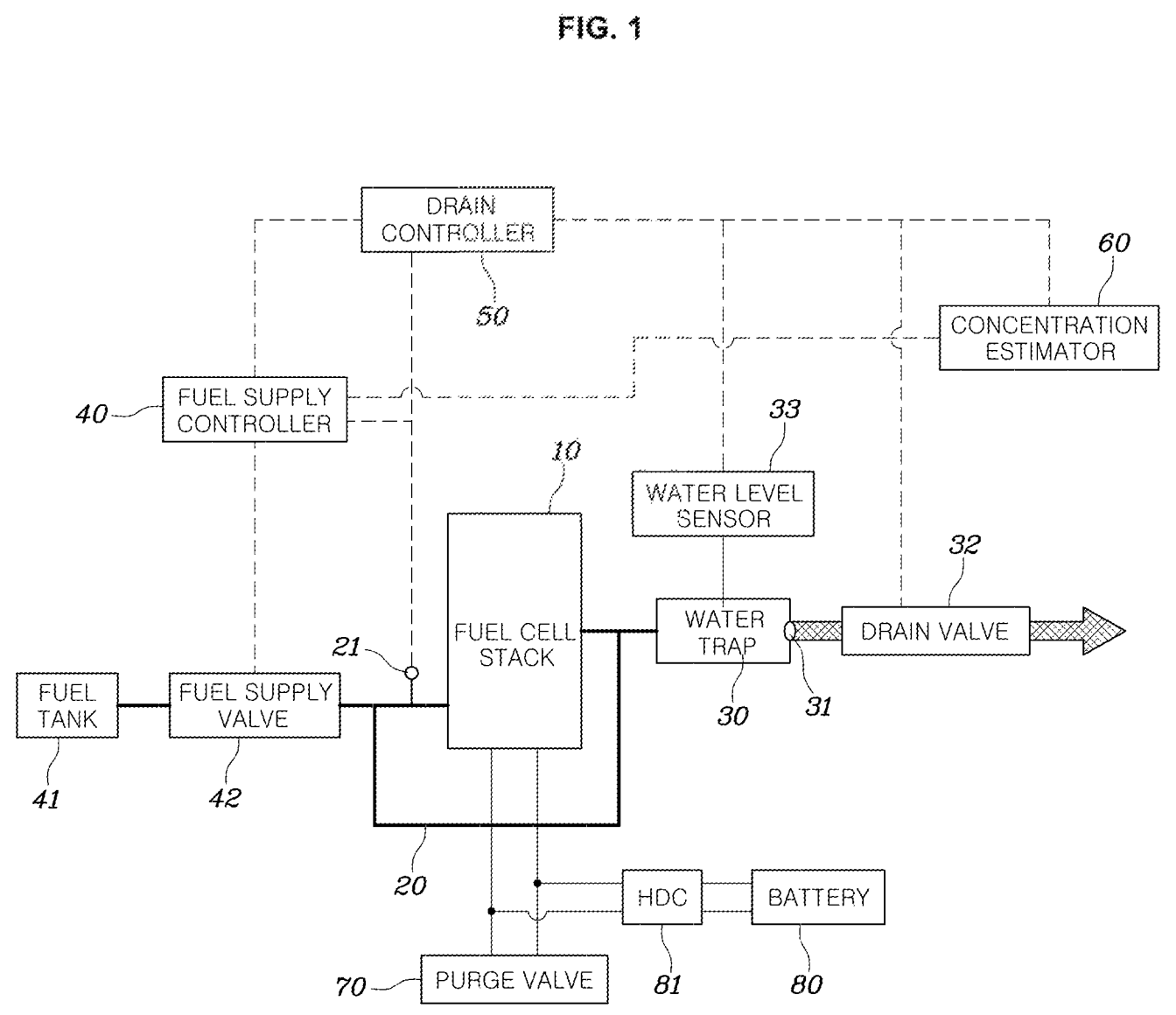

FIG. 1 is a view showing the construction of a condensate water drain control system for fuel cells according to an embodiment of the present disclosure.

Referring to FIG. 1, the condensate water drain control system for fuel cells according to the embodiment of the present disclosure includes a fuel cell stack 10 configured to generate electric power through chemical reaction in the fuel cell stack 10, a fuel supply line 20 configured to recirculate fuel discharged from the fuel cell stack 10 together with fuel introduced from a fuel supply valve 42 so as to be supplied to the fuel cell stack 10, a water trap 30 located in the fuel supply line 20, the water trap 30 being configured to collect condensate water discharged from the fuel cell stack 10, a drain valve 32 located in an outlet 31 of the water trap 30, the drain valve 32 being configured to discharge the condensate water stored in the water trap 30 to the outside when opened, and a drain controller 50 configured to determine whether the fuel supply valve 42 is controlled such that the pressure in the fuel supply line 20 is maintained before the drain valve 32 is opened and to sense the discharge of fuel from the fuel supply line 20 through the drain valve 32 upon determining that the pressure of the fuel supply line 20 is maintained.

The fuel cell stack 10 receives air including hydrogen and oxygen, as fuel, from a hydrogen electrode (anode) and an oxygen electrode (cathode), and generates electric power through chemical reaction. In the fuel cell stack 10, hydrogen and oxygen react with each other, whereby condensate water is generated.

The fuel supply line 20 supplies fuel from a fuel tank 41 to the fuel cell stack 10 and supplies fuel discharged from the fuel cell stack 10 to the fuel cell stack 10 through recirculation. That is, fuel discharged from the fuel cell stack 10 is supplied to the fuel cell stack 10 through recirculation in the state of being mixed with fuel supplied from the fuel tank 41.

The water trap 30 is provided in the fuel supply line 20 to store condensate water generated in the fuel cell stack 10. In particular, condensate water generated by the oxygen electrode of the fuel cell stack 10 and moved to the fuel supply line 20 as the result of diffusion to the hydrogen electrode is collected and stored in the water trap 30. The outlet 31 of the water trap 30 may be connected to the outside, or may be to a humidifier located in an oxygen electrode inlet of the fuel cell stack 10 in order to supply moisture.

The drain valve 32 may be provided in the outlet 31 of the water trap 30 to control the discharge of condensate water from the water trap 30. In particular, the drain valve 32 may allow the discharge of condensate water stored in the water trap 30 when opened, and may block the discharge of condensate water when closed.

In general, the drain valve 32 is controlled to be closed such that hydrogen is not discharged through the outlet 31 of the water trap 30, and is opened to discharge condensate water to the outside when the condensate water is intermittently stored.

The drain controller 50 may control opening and closing of the drain valve 32. In particular, the drain controller 50 may sense or predict the level of condensate water stored in the water trap 30, may perform control such that the drain valve 32 is opened in the state in which the level of condensate water is high, and perform control such that the drain valve 32 is closed when the level of condensate water is lowered as the result of opening of the drain valve 32.

FIG. 2 is a view showing conventional condensate water drain and fuel supply control signals.

Referring further to FIG. 2, conventionally, the water trap 30 includes a water level sensor 33 configured to sense the amount of condensate water stored in the water trap 30, and opening and closing of the drain valve 32 are controlled using the water level sensor 33.

In particular, when the storage amount of condensate water sensed by the water level sensor 33 is greater than or equal to a predetermined high-level critical value, the drain valve 32 is controlled to be opened, and when the storage amount of condensate water is less than or equal to a predetermined low-level critical value, the drain valve 32 is controlled to be closed.

However, the water level sensor 33 frequently malfunctions, whereby sensing accuracy is low and responsiveness is slow. As in an abnormal discharge state of FIG. 2, therefore, the drain valve 32 remains open, whereby hydrogen is discharged through the outlet 31, even when the discharge of condensate water is completed.

Conventionally, in order to solve this, control is performed such that the drain valve 32 is opened whenever the integrated value of output current of the fuel cell at the time of malfunction of the water level sensor 33 reaches a predetermined integrated current value, is maintained open for a predetermined opening time, and is then closed. However, opening and closing of the drain valve 32 are controlled irrespective of the amount of condensate water stored in the water trap 30, which causes the discharge of hydrogen or flooding of the fuel cell stack 10.

In order to estimate the amount of condensate water stored in the water trap 30 and to perform control based thereon even at the time of breakdown of the water level sensor 33, the drain controller 50 senses whether fuel is discharged from the fuel supply line 20 through the outlet 31 in the state in which the drain valve 32 is open, and performs control such that the drain valve 32 is closed upon sensing the discharge of fuel.

In particular, the fuel supply valve 42 controls the pressure in the fuel supply line 20 so as to follow target pressure (PI control), and the drain controller 50 senses the discharge of fuel through the outlet 31 based on a signal for controlling the opening degree of the fuel supply valve 42 in the state in which the drain valve 32 is open.

However, in the case in which such control is followed, as shown in FIG. 2, when the target pressure in the fuel supply line 20 is changed in the state in which the drain valve 32 is open, the pressure in the fuel supply line 20 and the control signal of the fuel supply valve 42 are variable, whereby fuel is misjudged to be discharged even in the case in which no fuel is discharged through the drain valve 32 (false detection of hydrogen discharge state).

According to the present disclosure, in order to solve this problem, the drain controller 50 may determine whether the fuel supply valve 42 is controlled such that the pressure in the fuel supply line 20 is maintained when the drain valve 32 is opened, and upon determining that the fuel supply valve is controlled such that the pressure of the fuel supply line is maintained, may sense the discharge of fuel from the fuel supply line 20 through the drain valve 32 in the state in which the drain valve 32 is open.

Consequently, the drain controller 50 may accurately sense the discharge of fuel through the drain valve 32 in the state in which the drain valve 32 is open, and therefore it is possible to prevent misjudgment of fuel discharge due to a change in pressure in the fuel supply line 20 due to another environmental change.

Here, that the fuel supply valve 42 is controlled such that the pressure in the fuel supply line 20 is maintained means that the fuel supply valve 42 is controlled such that the pressure in the fuel supply line 20 is maintained except that the pressure in the fuel supply line 20 is changed as the result of the discharge of fuel from the fuel supply line 20 through the drain valve 32. That is, a change in pressure in the fuel supply line 20 due to other factors is minimized in the state in which the drain valve 32 is open.

In particular, the drain controller 50 may determine whether the fuel supply valve 42 is controlled such that the pressure in the fuel supply line 20 is maintained based on a change in pressure in the fuel supply line 20 or a change in opening degree of the fuel supply valve 42 in the state in which the drain valve 32 is closed.

In an embodiment, a pressure sensor 21 configured to sense the pressure in the fuel supply line 20 may be further included, and the drain controller 50 may determine whether the fuel supply valve 42 is controlled such that the pressure in the fuel supply line 20 is maintained based on a change in a pressure signal sensed by the pressure sensor 21.

In particular, the pressure sensor 21 may be located in the fuel supply line 20 at the inlet side of the fuel cell stack 10 and may sense the pressure in the fuel supply line 20, and a fuel supply controller 40, a description of which will follow, may adjust the opening degree of the fuel supply valve 42 based on the pressure in the fuel supply line 20 sensed by the pressure sensor 21.

In particular, the drain controller 50 may differentiate the pressure signal sensed by the pressure sensor 21 or calculate variation (absolute value) from a previous sensing value, and may determine that the fuel supply valve 42 is controlled such that the pressure in the fuel supply line 20 is maintained in the case in which the calculated differential value or variation is maintained within a predetermined range for a period of time greater than or equal to a predetermined maintenance time.

In another embodiment, a fuel tank 41 configured to store fuel in the fuel tank 41 and a fuel supply controller 40 configured to control the opening degree of the fuel supply valve 42 such that the pressure in the fuel supply line 20 follows the target pressure may be further included, and the drain controller 50 may determine whether the fuel supply valve 42 is controlled such that the pressure in the fuel supply line 20 is maintained based on a change in a signal for controlling the opening degree of the fuel supply valve 42 from the fuel supply controller 40.

The fuel tank 41 may store high-pressure hydrogen in the fuel tank 41, and may supply the stored hydrogen to the fuel supply line 20 through the fuel supply valve 42. In particular, the high-pressure hydrogen stored in the fuel tank 41 may be supplied to the fuel supply line 20 after being decompressed.

The fuel supply controller 40 may control opening and closing of the fuel supply valve 42 based on the pressure in the fuel supply line 20, and the signal for controlling the opening degree of the fuel supply valve 42 may be output from the fuel supply controller 40.

In particular, the fuel supply controller 40 may control opening and closing of the fuel supply valve 42 based on the target pressure in the fuel supply line 20 and the pressure and temperature in the fuel supply line 20. That is, the signal for controlling the opening degree of the fuel supply valve 42 may be set based on the target pressure in the fuel supply line 20 and the pressure and temperature in the fuel supply line 20.

The drain controller 50 may differentiate the signal for controlling the opening degree of the fuel supply valve 42 from the fuel supply controller 40 or calculate variation (absolute value) from a previous control value, and may determine that the fuel supply valve 42 is controlled such that the pressure in the fuel supply line 20 is maintained in the case in which the calculated differential value or variation is maintained within a predetermined range for a period of time greater than or equal to a predetermined maintenance time.

Referring to FIG. 2, variation in a pressure signal of the fuel supply line 20 is relatively small, whereby it is difficult to sense the discharge of fuel through the drain valve 32; however, variation in a control signal of the fuel supply valve 42 is relatively large, whereby it is possible to rapidly, accurately, and easily sense the discharge of fuel.

In an embodiment, the fuel supply controller 40 may fix the target pressure in the fuel supply line 20 in the case in which opening of the drain valve 32 is required.

The fuel supply controller 40 may set the target pressure in the fuel supply line 20 based on required current or required power of the fuel cell. Particularly, in the case in which opening of the drain valve 32 is required, the fuel supply controller 40 may fix the target pressure in the fuel supply line 20 even though the required current or required power of the fuel cell is variable.

In another embodiment, a power controller configured to fix the required current or required power of the fuel cell in the case in which opening of the drain valve 32 is required may be further included.

The power controller may control the required current or required power of the fuel cell based on required current or required power of a load and the charge amount of a battery 80, a description of which will follow. That is, the power controller may set the required current or required power of the fuel cell in order to satisfy the required current of the load, which is changed in real time. However, the power controller may perform control such that the required current or required power of the fuel cell is fixed in the case in which opening of the drain valve 32 is required.

A battery 80 configured to assist generation of electric power by the fuel cell stack 10 while being charged or discharged by electric power generated by the fuel cell stack 10 and a load connected to the fuel cell stack 10 and the battery 80 to receive electric power from the fuel cell stack 10 or the battery 80 may be further included.

That is, the fuel cell stack 10 and the load may be connected to each other via a main bus end, and the battery 80 may be connected to the main bus end in parallel. In particular, a high-voltage converter 81 may be located between the main bus end and the battery 80, and the power controller may control the high-voltage converter 81 to control charging and discharging of the battery 80.

The power controller may control the required current or required power of the fuel cell based on the required power of the load or the charge amount of the battery 80, and may control charging and discharging of the battery 80 in order to satisfy the required power of the load in the case in which the required current or required power of the fuel cell is fixed.

That is, the power controller may satisfy the required power of the load through charging and discharging of the battery 80 when the required power of the load is variable in the case in which the required current or required power of the fuel cell is fixed.

In particular, required power Pt of the load may be the sum of required power Ps of the fuel cell stack 10 and auxiliary power Pb of the battery 80.

$$Pt=Ps+Pb->Pb=Pt-Ps$$

On the assumption that voltage of the main bus end between the fuel cell stack 10 and the load is V, discharge current Ib of the battery 80 is as follows.

$$Ib=Pt/V-Is$$

Here, in the case in which required current Is of the fuel cell stack 10 is fixed and the required power Pt of the load is variable, the discharge current Ib of the battery 80 may be variable to satisfy the required power Pt of the load.

Particularly, in the case in which Ib>0, which is the state in which the battery 80 is discharged, the power controller may control voltage of the high-voltage converter 81 to be Vref=V+α such that the battery 80 is discharged.

On the other hand, in the case in which Ib<0, which is the state in which the battery 80 is charged, the power controller may control voltage of the high-voltage converter 81 to be Vref=V−α such that the battery 80 is charged.

The drain controller 50 may control opening of the drain valve 32 based on the storage amount of condensate water sensed by the water level sensor 33. For example, when the storage amount of condensate water sensed by the water level sensor 33 is greater than or equal to a predetermined high-level critical value, the drain controller may determine that opening of the drain valve 32 is required.

In addition, when the storage amount of condensate water sensed by the water level sensor 33 is less than or equal to a predetermined low-level critical value, or when the discharge of fuel through the outlet 31 is sensed in the state in which the drain valve 32 is open, the drain controller 50 may perform control such that the drain valve 32 is closed.

In particular, the drain controller 50 may sense the discharge of fuel from the fuel supply line 20 through the drain valve 32 based on a change in pressure in the fuel supply line 20 or a change in opening degree of the fuel supply valve 42 in the state in which the drain valve 32 is open.

The drain controller 50 may sense the discharge of fuel from the fuel supply line 20 through the drain valve 32 based on a pressure signal sensed by the pressure sensor 21 or a signal for controlling the opening degree of the fuel supply valve 42 output from the fuel supply controller 40.

In an embodiment, in the case in which a rate of change in the signal for controlling the opening degree of the fuel supply valve 42 output from the fuel supply controller 40 is greater than or equal to a predetermined rate of change, the drain controller 50 may sense that fuel has been discharged.

In the case in which the rate of change over time in the signal for controlling the opening degree of the fuel supply valve 42 output from the fuel supply controller 40 is abruptly variable to greater than or equal to the predetermined rate of change, it may be determined that the pressure in the fuel supply line 20 is abruptly changed, and therefore it may be determined that fuel has been discharged through the outlet 31.

In another embodiment, in the case in which a difference between the signal for controlling the opening degree of the fuel supply valve 42 output from the fuel supply controller 40 and an output signal reference value based on a pre-mapped output signal map is greater than or equal to a predetermined error, it may be sensed that fuel has been discharged.

In the pre-mapped output signal map, the output signal reference value may be pre-mapped based on the target pressure in the fuel supply line 20 and the temperature in the fuel supply line 20, and in the case in which the difference between the output signal reference value based on the pre-mapped output signal map and the signal for controlling the opening degree of the fuel supply valve 42 output from the fuel supply controller 40 is greater than or equal to the predetermined error, it may be determined that the pressure in the fuel supply line 20 is abruptly changed, and therefore it may be determined that fuel has been discharged through the outlet 31.

In another embodiment, it may be sensed that fuel has been discharged at an inflection point at which a peak is formed as the result of the signal for controlling the opening degree of the fuel supply valve 42 output from the fuel supply controller 40 being decreased and then increased.

In an embodiment, the drain valve 32 may be configured to have a purge function of purging fuel in the fuel supply line 20 to the outside when the drain valve 32 is opened. That is, the drain valve 32 may discharge condensate water accumulated in the fuel supply line 20, and simultaneously perform the function of a purge valve 70 capable of purging fuel including impurities that flow in the fuel supply line 20 to the outside.

The drain controller 50 may measure a purge time from the point in time when the discharge of fuel from the fuel supply line 20 through the drain valve 32 is sensed to the point in time when the drain valve 32 is closed.

The drain controller 50 may measure a purge time for which gas including fuel is discharged from the fuel supply line 20 through the outlet 31 from the point in time when the discharge of fuel through the drain valve 32 is sensed to the point in time when the drain valve 32 is closed.

In another embodiment, the purge valve 70 may be separately located at the fuel supply line 20 downstream of the fuel cell stack 10.

A concentration estimator 60 configured to estimate an amount purged by opening of the drain valve 32 and to estimate the concentration of fuel in the fuel supply line 20 through reflection of the estimated purge amount may be further included.

The concentration estimator 60 may multiply a discharge rate over time by purge time (time from the point in time when the discharge of fuel through the drain valve 32 is sensed to the point in time when the drain valve 32 is closed) to estimate an amount purged by opening of the drain valve 32.

In particular, the concentration estimator 60 may estimate the concentration of fuel in the fuel supply line 20 in real time by reflecting the purge amount and crossover amount transmitted to an air supply line due to diffusion in the initial concentration in the fuel supply line 20.

In particular, the concentration of fuel in the fuel supply line 20 may be estimated on the assumption that only nitrogen, hydrogen, and vapor are present in the fuel supply line 20 while having uniform concentration throughout the fuel supply line 20, as expressed by the following numerical formula.

$$\frac{n_{H_2}}{n_{An}} = 1 = \frac{n_{N_2}}{n_{An}} - \frac{n_v}{n_{An}}$$

Here, $n_{An}$ is the total amount of gases in the fuel supply line 20, $n_{H_2}$ is the amount of nitrogen, $n_v$ is the amount of vapor, and $n_{H_2}$ is the amount of hydrogen.

The concentration of fuel in the fuel supply line 20 may be estimated by reflecting the amount of nitrogen and the amount of vapor introduced through crossover, the amount of hydrogen discharged through crossover, the purge amount, and the discharge amount in the initial concentration in the fuel supply line 20.

The total amount of gases $n_{An}$ in the fuel supply line 20 may be estimated from an abnormal gas state equation using pressure P, volume V, and temperature T in the fuel supply line 20, as expressed by the following numerical formula.

$$n_{An} = \frac{P_{An} V_{An}}{RT} \text{ [mol]}$$

Here, R is a gas constant, 8.314 [J/mol K].

The amount of nitrogen and the amount of vapor may be estimated by adding (amount of nitrogen introduced through crossover/amount of vapor-amount of nitrogen by purge/amount of vapor-amount of nitrogen discharged through outlet 31/amount of vapor) to the initial amount through integration over time, as expressed by the following numerical formula.

$$n_v = n_{v\_init} + \int (\dot{n}_{v\_xo} - \dot{n}_{v\_purge} - \dot{n}_{v\_drain}) dt$$

$$n_{N_2} = n_{N_2\_init} + \int (\dot{n}_{N_2\_xo} - \dot{n}_{N_2\_purge} - \dot{n}_{N_2\_drain}) dt$$

The initial amount of nitrogen or vapor may be estimated based on the pre-mapped map by reflecting the operation stop time in the case in which the operation of the fuel cell is stopped and then resumed.

In particular, the crossover amount of gas may be calculated by applying Fick's law (law of diffusion) below. The diffusion rate of gas may be inversely proportional to the thickness of an electrolyte membrane of the fuel cell stack 10, and may be proportional to a difference in partial pressure of gas between the anode and the cathode.

$$\frac{\dot{m}}{A} = -D\frac{\partial c}{\partial x} = -D\frac{M}{RT}\frac{\partial P}{\partial x}$$

Here, ṁ is mass diffusivity of gas (g/s), A is diffusion area, D is a diffusion coefficient of gas, x is diffusion distance, c is the concentration of gas, R is a universal gas constant (8.314 J/mol K), P is the pressure of gas, T is the temperature of gas, and M is a molar mass of gas (g/mol), which may be arranged as follows.

$$\dot{m} = -D\frac{M}{RT}\frac{\partial P}{\partial x}A = \dot{n} \cdot M$$

$$\dot{n} = -D\frac{1}{RT}\frac{\partial P}{\partial x}A$$

Here, ṅ is diffusivity of gas (mol/s).

That is, the crossover amount of gas through the electrolyte membrane of the fuel cell stack 10 may be calculated by the following numerical formula.

$$\dot{n}_{N2\_xo} = \frac{D_{N2}}{RT} \frac{P_{Ca,N2} - P_{An,N2}}{\delta} A$$

Here, $\dot{n}_{N_2\_xo}$ is diffusivity of nitrogen, P is pressure [kPa], R is a gas constant (8.314 [J/mol K]), T is temperature [K], D is a diffusion coefficient, A is the area of the electrolyte membrane, $\delta$ is the thickness of the electrolyte membrane, $P_{Ca,N2}$ is the partial pressure of nitrogen at the cathode of the fuel cell, and $P_{An,N2}$ is the partial pressure of nitrogen at the anode of the fuel cell.

$$\dot{n}_{v\_xo} = \frac{D_v}{RT} \frac{P_{Ca,v} - P_{An,v}}{\delta} A$$

Here, $\dot{n}_{v\_xo}$ is diffusivity of vapor, P is pressure [kPa], R is a gas constant (8.314 [J/mol K]), T is temperature [K], D is a diffusion coefficient, A is the area of the electrolyte membrane, $\delta$ is the thickness of the electrolyte membrane, $P_{Ca,v}$ is the partial pressure of vapor at the cathode of the fuel cell, and $P_{An,v}$ is the partial pressure of vapor at the anode of the fuel cell.

Reversely, hydrogen may cross over from the anode to the cathode of the fuel cell.

$$\dot{n}_{H2\_xo} = \frac{D_{H2}}{RT} \frac{P_{An,H2} - P_{Ca,H2}}{\delta} A$$

Here, $\dot{n}_{H2\_xo}$ is diffusivity of hydrogen, P is pressure [kPa], R is a gas constant (8.314 [J/mol K]), T is temperature [K], D is a diffusion coefficient, A is the area of the electrolyte membrane, $P_{An,H2}$ is the partial pressure of vapor at the anode, and $P_{Ca,H2}$ is the partial pressure of vapor at the cathode.

In addition, diffusivity of gas may be proportional to a diffusion coefficient of gas, and the diffusion coefficient of gas may be variable depending on water content and temperature of the electrolyte membrane located between the anode and the cathode of the fuel cell.

In order to improve accuracy, a value that is variable depending on the state, such as the degree of degradation or temperature, of the fuel cell may be used as the diffusion coefficient D of gas although a fixed constant value may be used as the diffusion coefficient D of gas. In particular, the diffusion coefficient D of gas may be calculated using a value that is variable depending on water content and temperature of the electrolyte membrane located between the anode and the cathode of the fuel cell. In addition, the diffusion coefficient D of gas may be calculated as a variable value depending on degradation of the electrolyte membrane of the fuel cell stack 10.

The purge amount may be estimated by integrating, over time, a discharge rate over time or multiplying the discharge rate over time by purge time.

The discharge rate over time $\dot{n}_{purge}$ may be proportional to a difference between gas pressure $P_{An}$ at the anode and external gas pressure $P_{out}$. The external gas pressure $P_{out}$ may be gas pressure at the cathode. A concrete numerical formula may be as follows.

$$\dot{n}_{purge} = C(P_{An} - P_{out})$$

Here, C is a purge gain value, which may be set based on the opening degree of the purge valve 70 at the time of purge.

As expressed by the following numerical formula, the discharge rate over time may be proportional to a difference in pressure between the fuel supply line 20 and the outside, and a discharge gain may be multiplied as a proportional constant. The discharge gain may be proportional to the diameter or the area of the outlet 31 of the water trap 30.

$$\dot{n}_{arsin} = C_d(P_{An} - P_{Stk\_Out})$$

Here, $\dot{n}_{arsin}$ is a discharge rate over time, $C_d$ is a discharge gain, $P_{An}$ is pressure in the fuel supply line 20, and $P_{Stk\_Out}$ is external pressure.

In addition, the purge amount of each gas may be estimated by multiplying the total purge amount by the concentration of each gas in the fuel supply line 20.

Furthermore, control may be performed such that the concentration in the fuel supply line 20 follows target concentration using the concentration of fuel in the fuel supply line 20 estimated by the concentration estimator 60. In particular, the concentration of fuel in the fuel supply line 20 may be adjusted by controlling opening of the purge valve 70, controlling opening of the drain valve 32 having the purge function, or controlling the fuel supply valve 42.

Consequently, it is possible to prevent degradation of the fuel cell stack 10 due to a decrease in concentration of fuel in the fuel supply line 20, whereby it is possible to improve durability and to prevent a reduction in fuel efficiency due to excessive concentration of fuel.

In an exemplary embodiment of the present disclosure, the fuel supply controller 40, the drain controller 50, and the concentration estimator 60 may be realized by a non-volatile memory (not shown) configured to store an algorithm for controlling the operation of various elements of a vehicle or data on software commands for executing the algorithm and a processor (not shown) configured to perform an operation, which will be described below, using the data stored in the memory. Here, the memory and the processor may be realized as individual chips. Alternatively, the memory and the processor may be realized as a single integrated chip. The processor may include one or more processors.

FIG. 3 is a flowchart showing a condensate water drain control method for fuel cells according to an embodiment of the present disclosure.

Referring to FIG. 3, the condensate water drain control method for fuel cells according to the embodiment of the present disclosure includes a step of determining whether the fuel supply valve 42 is controlled such that the pressure in the fuel supply line 20, configured to recirculate fuel discharged from the fuel cell stack 10 together with fuel introduced from the fuel supply valve 42 so as to be supplied to the fuel cell stack 10, is maintained (S300), a step of opening the drain valve 32, located in the outlet 31 of the water trap 30 located in the fuel supply line 20, the water trap being configured to collect condensate water discharged from the fuel cell stack 10, the drain valve being configured to discharge the condensate water stored in the water trap 30 to the outside when opened (S400), and a step of sensing discharge of fuel from the fuel supply line 20 through the drain valve 32 upon determining in the determination step (S300) that the pressure is maintained (S500).

In the step of determining whether the fuel supply valve 42 is controlled such that the pressure in the fuel supply line 20 is maintained (S300), it may be determined whether the fuel supply valve 42 is controlled such that the pressure in the fuel supply line 20 is maintained based on a change in pressure in the fuel supply line 20 or a change in opening degree of the fuel supply valve 42 in the state in which the drain valve 32 is closed.

Before the step of determining whether the fuel supply valve 42 is controlled such that the pressure in the fuel supply line 20 is maintained (S300), a step of determining whether opening of the drain valve 32 is required (S100) and a step (S200) of fixing the target pressure in the fuel supply line 20 (S210) or fixing the required current or the required power of the fuel cell stack 10 (S220) upon determining that opening of the drain valve 32 is required may be further included.

After the step of sensing the discharge of fuel (S500), a step of measuring a purge time from the point in time when the discharge of fuel from the fuel supply line 20 through the drain valve 32 is sensed to the point in time when the drain valve 32 is closed (S600), a step of estimating an amount purged by opening of the drain valve 32 based on the measured purge time (S700), and a step of estimating the concentration of fuel in the fuel supply line 20 through reflection of the estimated purge amount (S800) may be further included.

A condensate water drain control system for fuel cells according to another embodiment of the present disclosure may include a fuel cell stack 10 configured to generate electric power through chemical reaction in the fuel cell stack 10, a fuel supply line 20 configured to recirculate fuel discharged from the fuel cell stack 10 together with fuel introduced from a fuel supply valve 42 so as to be supplied to the fuel cell stack 10, a water trap 30 located in the fuel supply line 20, the water trap being configured to collect condensate water discharged from the fuel cell stack 10, a drain valve 32 located in an outlet 31 of the water trap 30, the drain valve 32 being configured to discharge the condensate water stored in the water trap 30 to the outside when opened, a drain controller 50 configured to sense the discharge of fuel from the fuel supply line 20 through the drain valve 32, and a fuel supply controller 40 configured to control the fuel supply valve 42 such that the pressure in the fuel supply line 20 is maintained when the drain valve 32 is opened under control of the drain controller 50.

The drain controller 50 may perform control such that the drain valve 32 is opened in the case in which discharge of condensate water stored in the water trap 30 is required. That is, the drain valve 32 may be opened in the case in which opening of the drain valve 32 is required.

In addition, the drain controller 50 may sense the discharge of fuel from the fuel supply line 20 through the drain valve 32 in the state in which the drain valve 32 is open. In particular, the drain controller 50 may sense the discharge of fuel from the fuel supply line 20 based on a pressure signal sensed by a pressure sensor 21 or a signal for controlling the opening degree of the fuel supply valve 42 output from the fuel supply controller 40.

The fuel supply controller 40 may control the fuel supply valve 42 such that the pressure in the fuel supply line 20 is maintained while the drain valve 32 is open or before the drain valve 32 is opened.

In particular, the fuel supply controller 40 may control the fuel supply valve 42 such that the pressure in the fuel supply line 20 is maintained by fixing target pressure in the fuel supply line 20 or required current or required power of the fuel cell stack 10 while the drain valve 32 is open or before the drain valve 32 is opened.

As is apparent from the above description, the condensate water drain control system and method for fuel cells according to the present disclosure have the effect of minimizing the discharge of hydrogen from the water trap through the outlet caused due to inaccuracy and slow responsiveness of the water level sensor.

In addition, the condensate water drain control system and method for fuel cells according to the present disclosure have the effect of accurately estimating the concentration of fuel in the fuel supply line so as to be used for purge control, etc., thereby improving accuracy in controlling the concentration of fuel in the fuel supply line, and preventing unnecessary purge control, thereby improving fuel economy.

In addition, the condensate water drain control system and method for fuel cells according to the present disclosure have the effect of performing control such that the pressure in the fuel supply line is variable in order to solve a problem in that the discharge of fuel through the drain valve is falsely detected, thereby accurately estimating the concentration of fuel in the fuel supply line and thus improving durability.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. A condensate water drain control method for fuel cells, the condensate water drain control method comprising the steps of:

determining, by a drain controller, whether a fuel supply valve is controlled such that pressure is maintained in a fuel supply line except for change as a result of discharge from the fuel supply line through a drain valve, wherein the fuel supply line is configured to recirculate fuel discharged from a fuel cell stack together with fuel introduced from the fuel supply valve so as to be supplied to the fuel cell stack;

opening, by the drain controller, a drain valve located in an outlet of a water trap located in the fuel supply line, the water trap being configured to collect condensate water discharged from the fuel cell stack, the drain valve being configured to discharge condensate water stored in the water trap to an outside when opened;

sensing, by the drain controller, discharge of fuel from the fuel supply line through the drain valve upon determining in the determining step that the pressure is maintained;

differentiating a signal output from a fuel supply controller for controlling an opening degree of the fuel supply valve or calculating variation of an absolute value from a previous control value, by the drain controller; and controlling, by the drain controller, the fuel supply valve such that the pressure in the fuel supply line is maintained in a case in which the calculated differential value is maintained within a predetermined range for a period of time greater than or equal to a predetermined maintenance time;

wherein the drain controller is further configured to sense that fuel has been discharged when a rate of change in the signal for controlling the opening degree of the fuel supply valve is greater than or equal to a predetermined rate of change.

2. The condensate water drain control method according to claim 1, wherein the step of determining whether the fuel supply valve is controlled such that the pressure in the fuel supply line is maintained, except for change as a result of discharge from the fuel supply line through a drain valve, comprises determining whether the fuel supply valve is controlled such that the pressure in the fuel supply line is maintained except for change as a result of discharge from the fuel supply line through a drain valve, based on a change in pressure in the fuel supply line.

3. The condensate water drain control method according to claim 1, further comprising:

determining whether opening of the drain valve is required before the step of determining whether the fuel supply valve is controlled such that the pressure in the fuel supply line is maintained except for change as a result of discharge from the fuel supply line through a drain valve; and fixing a target pressure in the fuel supply line or fixing required current or required power of the fuel cell stack upon determining that opening of the drain valve is required.

4. The condensate water drain control method according to claim 1, further comprising:

measuring a purge time from a point in time when the discharge of fuel from the fuel supply line through the drain valve is sensed to a point in time when the drain valve is closed after the step of sensing the discharge of fuel;

estimating an amount purged by opening of the drain valve based on the measured purge time; and estimating concentration of fuel in the fuel supply line through reflection of the estimated purge amount.

* * * * *